April 7, 1931.    E. G. McDONALD    1,799,598

TRUNNION

Filed July 16, 1927

INVENTOR
EUGENE G. McDONALD
BY
Jn. W. McConkey
ATTORNEY

Patented Apr. 7, 1931

1,799,598

UNITED STATES PATENT OFFICE

EUGENE G. McDONALD, OF SOUTH BEND, INDIANA, ASSIGNOR TO BENDIX BRAKE COMPANY, OF SOUTH BEND, INDIANA, A CORPORATION OF ILLINOIS

TRUNNION

Application filed July 16, 1927. Serial No. 206,146.

This invention relates to operating means for mechanism such as an automobile brake and is illustrated as embodied in a novel sheet metal trunnion forming part of a universal joint.

One feature of the invention relates to forming the trunnion of pressed metal generally C-shaped in cross-section to form an opening across one side of the trunnion, the central portion being flattened to form parallel walls between which the opening extends and which embrace a flattened eye on the end of the operating shaft, the end portions of the trunnion being cylindrical for mounting in a cross bore or bearing in a shaft operated by the trunnion.

The above and other objects and features of the invention, including various novel and desirable details of construction, will be apparent from the following description of one illustrative embodiment shown in the accompanying drawing, in which.

Figure 1:
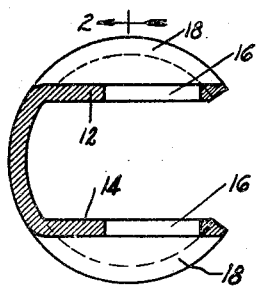
Figure 1 is a section crosswise through the trunnion at its center.
Figure 6:
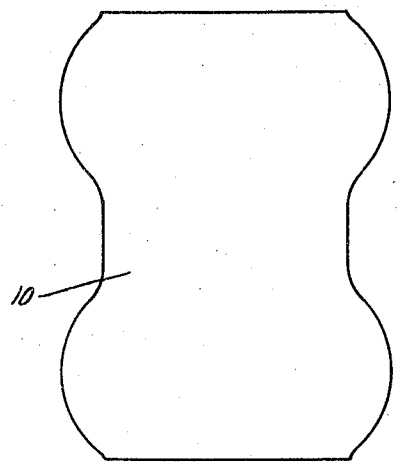
Figure 6 is a plan of the blank from which the trunnion is pressed.
Figure 2:
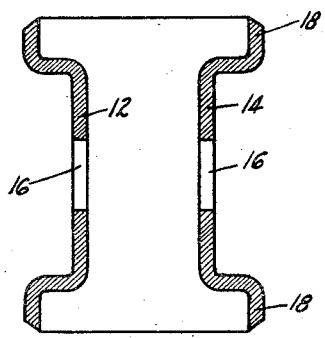
Figure 2 is a section lengthwise through the trunnion on the line 2—2 of Figure 1.
Figure 3:
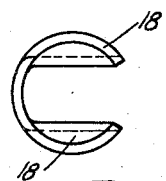
Figure 3 is an end elevation of the trunnion.
Figure 7:
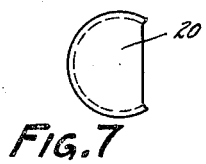
Figures 7 and 8 are respectively end and side elevations of a cap which may be inserted in the end of the trunnion to reinforce it against crushing.
Figure 4:
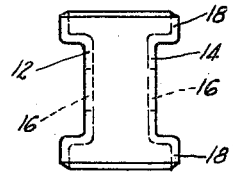
Figure 4 is a side elevation of the trunnion looking from the left in Figures 1 and 3.
Figure 5:
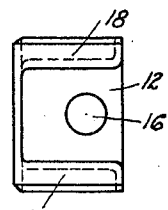
Figure 5 is a top plan view of the trunnion.
Figure 8:

The novel trunnion which forms the subject-matter of the present invention is intended for use in a universal joint forming part of the connection between two operating shafts for a front wheel automobile brake, and is intended to replace the trunnion shown in Figures 6, 7, and 8 of Patent No. 1,595,136, granted Bendix Brake Company on August 10, 1926, on application of W. J. Andres. As is fully explained in that patent, the trunnion is intended to be journalled in a cylindrical cross bore in a brake-applying device and must therefore be cylindrical at least at its ends and must be provided with parallel surfaces at least at its center embracing a flattened eye on the end of the operating shaft, which shaft extends into the interior of the trunnion.

According to the present invention, the trunnion is stamped from a blank 10 shown in Figure 6 in such a manner that the trunnion is generally C-shaped in cross-section and is provided at its center with flattened walls or portions 12 and 14 between which the opening along the side of the trunnion extends, and which are shown formed with openings 16 for a pin pivotally connecting the trunnion to the eye in the operating shaft. The ends of the trunnion are flared into the form of cylindrical flanges 18 adapted to be journalled in the cross bore in the shaft which is operated by the trunnion. The flanges 18 are shown beveled to form a substantially spherical surface to avoid interference with the bearing of the shaft in which the trunnion is mounted.

If it is desired to reinforce the ends of the trunnion against crushing small caps 20 shown in Figures 7 and 8 may be formed from sheet metal and pressed into the ends of the trunnion to close them.

While one illustrative embodiment has been described in detail, it is not my intention to limit the scope of the invention to that particular embodiment or otherwise than by the terms of the appended claim.

I claim:

A trunnion of the type described, of pressed metal, and which is generally C-shaped in cross-section to form an opening across one side, the central portions being flattened to form parallel walls between which said opening extends, and the end portions being cylindrical, together with caps for said end portions reinforcing them against crushing.

In testimony whereof, I have hereunto signed my name.

EUGENE G. McDONALD.